(12) United States Patent
Jiang

(10) Patent No.: US 8,429,747 B2
(45) Date of Patent: Apr. 23, 2013

(54) METHOD AND DEVICE FOR DETECTING FLOOD ATTACKS

(75) Inventor: Wu Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 949 days.

(21) Appl. No.: 12/390,664

(22) Filed: Feb. 23, 2009

(65) Prior Publication Data

US 2009/0271865 A1   Oct. 29, 2009

(30) Foreign Application Priority Data

Apr. 23, 2008   (CN) .......................... 2008 1 0095023

(51) Int. Cl.
 *H04L 29/06* (2006.01)
(52) U.S. Cl.
 USPC ........................................................... 726/23
(58) Field of Classification Search .............. 726/22–24; 720/22, 23
 See application file for complete search history.

(56) References Cited

U.S. PATENT DOCUMENTS

| | | | | |
|---|---|---|---|---|
| 6,901,517 | B1 * | 5/2005 | Redmore | 726/11 |
| 7,818,795 | B1 * | 10/2010 | Arad | 726/13 |
| 2004/0054925 | A1 | 3/2004 | Etheridge et al. | |
| 2005/0010817 | A1 * | 1/2005 | Jakubik et al. | 713/201 |
| 2006/0010389 | A1 * | 1/2006 | Rooney et al. | 715/736 |
| 2006/0107318 | A1 | 5/2006 | Jeffries et al. | |
| 2008/0086434 | A1 | 4/2008 | Chesla | |
| 2008/0271146 | A1 | 10/2008 | Rooney et al. | |
| 2008/0307524 | A1 * | 12/2008 | Singh et al. | 726/22 |

FOREIGN PATENT DOCUMENTS

| | | | |
|---|---|---|---|
| CN | 1578231 | A | 2/2005 |
| CN | 1719783 | A | 1/2006 |
| CN | 1750536 | A | 3/2006 |
| CN | 101018156 | A | 8/2007 |
| CN | 101267313 | A | 9/2008 |
| KR | 20080010095 | A * | 1/2008 |
| KR | 20080010095 | A | 1/2008 |

OTHER PUBLICATIONS

State Intellectual Property Office of the People's Republic of China, Examination Report in Chinese Patent Application No. 200810095023.X (Mar. 18, 2010).
Written Opinion of the International Searching Authority in corresponding International Patent Application No. PCT/CN2009/070633 (Jun. 11, 2009).

* cited by examiner

*Primary Examiner* — Ali Abyaneh
(74) *Attorney, Agent, or Firm* — Leydig, Voit & Mayer, Ltd.

(57) ABSTRACT

Disclosed is a flood attack detection method, wherein the total number of keywords of a source packet is acquired, and the number of feature parameters corresponding to the source packet is acquired. A ratio of the number of feature parameters to the total number of keywords is compared with a preset threshold, and if the ratio is greater than or equal to the preset threshold, it is determined that a flood attack occurs.

5 Claims, 6 Drawing Sheets

| No.. | Time | Source | Destination | Protocol | Info | Netbot CC |
|---|---|---|---|---|---|---|
| 26 | 0.764464 | 192.168.1.108 | 192.168.1.15 | TCP | http > 3585 [SYN, ACK] Seq=0 Ack=1 Win=5840 Len=0 MSS=1460 | |
| 27 | 0.764484 | 192.168.1.15 | 192.168.1.108 | TCP | 3585 > http [ACK] Seq=1 Ack=1 Win=65535 Len=0 | |
| 28 | 0.764600 | 192.168.1.15 | 192.168.1.108 | HTTP | GET /index.html HTTP/1.1 | |
| 29 | 0.764604 | 192.168.1.15 | 192.168.1.108 | HTTP | GET /index.html HTTP/1.1 | |
| 30 | 0.764850 | 192.168.1.108 | 192.168.1.15 | TCP | http > 3585 [ACK] Seq=1 Ack=138 Win=6432 Len=0 | |
| 31 | 0.764945 | 192.168.1.108 | 192.168.1.15 | TCP | http > 3586 [ACK] Seq=1 Ack=138 Win=6432 Len=0 | |
| 32 | 0.765994 | 192.168.1.108 | 192.168.1.15 | HTTP | HTTP/1.1 200 OK (text/html) | |
| 33 | 0.766188 | 192.168.1.108 | 192.168.1.15 | TCP | http > 3585 [FIN, ACK] Seq=274 Ack=138 Win=6432 Len=0 | |
| 34 | 0.766210 | 192.168.1.15 | 192.168.1.108 | TCP | 3585 > http [ACK] Seq=138 Ack=275 Win=65262 Len=0 | |
| 35 | 0.768010 | 192.168.1.108 | 192.168.1.15 | HTTP | HTTP/1.1 200 OK (text/html) | |
| 36 | 0.768217 | 192.168.1.108 | 192.168.1.15 | TCP | http > 3586 [FIN, ACK] Seq=274 Ack=138 Win=6432 Len=0 | |
| 37 | 0.768237 | 192.168.1.15 | 192.168.1.108 | TCP | 3586 > http [ACK] Seq=138 Ack=275 Win=65262 Len=0 | |
| 38 | 0.770983 | 192.168.1.15 | 192.168.1.108 | TCP | 3585 > http [FIN, ACK] Seq=138 Ack=275 Win=65262 Len=0 | |
| 39 | 0.771226 | 192.168.1.108 | 192.168.1.15 | TCP | http > 3585 [ACK] Seq=275 Ack=139 Win=6432 Len=0 | |
| 40 | 0.777133 | 192.168.1.15 | 192.168.1.108 | TCP | 3586 > http [FIN, ACK] Seq=138 Ack=275 Win=65262 Len=0 | |
| 41 | 0.777381 | 192.168.1.108 | 192.168.1.15 | TCP | http > 3586 [ACK] Seq=275 Ack=139 Win=6432 Len=0 | |
| 42 | 0.781950 | 192.168.1.15 | 192.168.1.108 | TCP | 3587 > http [SYN] Seq=0 Len=0 MSS=1460 | |
| 43 | 0.782261 | 192.168.1.108 | 192.168.1.15 | TCP | http > 3587 [SYN, ACK] Seq=0 Ack=1 Win=5840 Len=0 MSS=1460 | |
| 44 | 0.782290 | 192.168.1.15 | 192.168.1.108 | TCP | 3587 > http [ACK] Seq=1 Ack=1 Win=65535 Len=0 | |
| 45 | 0.782406 | 192.168.1.15 | 192.168.1.108 | HTTP | GET /index.html HTTP/1.1 | |
| 46 | 0.782568 | 192.168.1.15 | 192.168.1.108 | TCP | 3588 > http [SYN] Seq=0 Len=0 MSS=1460 | |
| 47 | 0.782728 | 192.168.1.108 | 192.168.1.15 | TCP | http > 3587 [ACK] Seq=1 Ack=138 Win=6432 Len=0 | |
| 48 | 0.782840 | 192.168.1.108 | 192.168.1.15 | TCP | http > 3588 [SYN, ACK] Seq=0 Ack=1 Win=5840 Len=0 MSS=1460 | |
| 49 | 0.782860 | 192.168.1.15 | 192.168.1.108 | TCP | 3588 > http [ACK] Seq=1 Ack=1 Win=65535 Len=0 | |
| 50 | 0.782970 | 192.168.1.15 | 192.168.1.108 | HTTP | GET /index.html HTTP/1.1 | |
| 51 | 0.783332 | 192.168.1.108 | 192.168.1.15 | TCP | http > 3588 [ACK] Seq=1 Ack=138 Win=6432 Len=0 | |
| 52 | 0.785294 | 192.168.1.108 | 192.168.1.15 | HTTP | HTTP/1.1 200 OK (text/html) | |
| 53 | 0.785 | Obvious features are provided for time frequency and number of URLs | .15 | TCP | http > 3587 [FIN, ACK] Seq=274 Ack=138 Win=6432 Len=0 | |
| 54 | 0.785 | | .108 | TCP | 3587 > http [ACK] Seq=138 Ack=275 Win=65262 Len=0 | |
| 55 | 0.785 | | .108 | TCP | 3587 > http [FIN, ACK] Seq=138 Ack=275 Win=65262 Len=0 | |

FIG. 3

| No.. | Time | Source | Destination | Protocol | Info | Http Nocache attack |
|---|---|---|---|---|---|---|
| 2 | 1.331953 | 192.168.1.15 | 192.168.1.108 | TCP | 2568 > http [SYN] Seq=0 Len=0 MSS=1460 | |
| 3 | 1.331954 | 192.168.1.15 | 192.168.1.108 | TCP | 2569 > http [SYN] Seq=0 Len=0 MSS=1460 | |
| 4 | 1.332434 | 192.168.1.108 | 192.168.1.15 | TCP | http > 2568 [SYN, ACK] Seq=0 Ack=1 Win=5840 Len=0 MSS=1460 | |
| 5 | 1.332462 | 192.168.1.15 | 192.168.1.108 | TCP | 2568 > http [ACK] Seq=1 Ack=1 Win=65535 Len=0 | |
| 6 | 1.332575 | 192.168.1.15 | 192.168.1.108 | HTTP | GET /*(&*ATGH*JIHGA&*(&^%*(*)OK)(*&^%$EDRGF%&A.html HTTP/1.1 | |
| 7 | 1.332635 | 192.168.1.108 | 192.168.1.15 | TCP | http > 2569 [SYN, ACK] Seq=0 Ack=1 Win=5840 Len=0 MSS=1460 | |
| 8 | 1.332652 | 192.168.1.15 | 192.168.1.108 | TCP | 2569 > http [ACK] Seq=1 Ack=1 Win=65535 Len=0 | |
| 9 | 1.332775 | 192.168.1.15 | 192.168.1.108 | HTTP | GET /*(&*ATGH*JIHGA&*(&^%*(*)OK)(*&^%$EDRGF%&A.html HTTP/1.1 | |
| 10 | 1.332819 | 192.168.1.108 | 192.168.1.15 | TCP | http > 2568 [ACK] Seq=1 Ack=174 Win=6432 Len=0 | |
| 11 | 1.333044 | 192.168.1.108 | 192.168.1.15 | TCP | http > 2569 [ACK] Seq=1 Ack=174 Win=6432 Len=0 | |
| 12 | 1.336848 | 192.168.1.108 | 192.168.1.15 | HTTP | HTTP/1.1 400 Bad Request (text/html) | |
| 13 | 1.337219 | 192.168.1.15 | 192.168.1.108 | TCP | 2569 > http [FIN, ACK] Seq=174 Ack=486 Win=65050 Len=0 | |
| 14 | 1.337526 | 192.168.1.15 | 192.168.1.108 | TCP | 2570 > http [SYN] Seq=0 Len=0 MSS=1460 | |
| 15 | 1.337762 | 192.168.1.108 | 192.168.1.15 | TCP | http > 2570 [SYN, ACK] Seq=0 Ack=1 Win=5840 Len=0 MSS=1460 | |
| 16 | 1.337787 | 192.168.1.15 | 192.168.1.108 | TCP | 2570 > http [ACK] Seq=1 Ack=1 Win=65535 Len=0 | |
| 18 | 1.338092 | 192.168.1.108 | 192.168.1.15 | TCP | http > 2570 [ACK] Seq=1 Ack=174 Win=6432 Len=0 | |
| 19 | 1.338502 | 192.168.1.108 | 192.168.1.15 | TCP | http > 2569 [FIN, ACK] Seq=486 Ack=175 Win=6432 Len=0 | |
| 20 | 1.338518 | 192.168.1.15 | 192.168.1.108 | TCP | 2569 > http [ACK] Seq=175 Ack=487 Win=65050 Len=0 | |
| 21 | 1.339206 | 192.168.1.108 | 192.168.1.15 | HTTP | HTTP/1.1 400 Bad Request (text/html) | |
| 22 | 1.3... | Substantial difference from the above two lies in "GET" a mass string | 3.1.108 | TCP | 2570 > http [FIN, ACK] Seq=174 Ack=486 Win=65050 Len=0 | |

FIG. 5

METHOD AND DEVICE FOR DETECTING FLOOD ATTACKS

CROSS-REFERENCE TO RELATED APPLICATIONS

This application claims priority to Chinese Patent Application No. 200810095023.X, filed Apr. 23, 2008, which is hereby incorporated by reference in its entirety.

FIELD OF THE INVENTION

The present invention relates to a communication technology field, and more particularly, to a flood attacks detection method and a detection device.

BACKGROUND OF THE INVENTION

A Distributed Denial of Service (DDOS) attack is one type of flood attacks, which mainly refers to that the attacker controls a large quantity of infected hosts to form an attack network by using a main control host as a platform (which may have multiple levels or multiple layers), so as to perform a large-scale attacks of service denial to an affected host. This attack may usually magnify the attack of a single attacker by levels, so as to cause a significant influence to the affected host, as well as severe network congestion.

One method of detecting the DDOS attack is a traffic anomaly detection. The principle of the traffic anomaly detection lies in that the packet traffic of each protocol is evenly varied in a normal situation and will only be significantly varied after being affected by some specific attacks. The traffic anomaly detection is usually divided into two stages. One is a study stage, including studying through some sample traffic so as to establish an initial analysis model. Further, the system enters an operating stage, collects the packet traffic and performs traffic statistics, performs an analysis on the traffic model, and compares the analysis with the initial analysis model. If the difference of the two is greater than the threshold, it is determined to be abnormal; otherwise, traffic study is performed, and the initial analysis model is modified continuously.

Another method of detecting the DDOS attack is a packet transmission frequency detection. As a result of the DDOS attack, a feature of large traffic is usually presented, and the traffic is usually inter-related to the packet transmission frequency of the packet. Therefore, the packet transmission frequency can be counted, and then the result is compared with the threshold. If the result is greater than the threshold, it is determined to be abnormal; otherwise, it is determined to be normal.

One of the challenges in implementing detecting DDOS attacks is the accuracy. As for the traffic anomaly detection method, if the attack is a flood attack under a small traffic, the variation of the traffic in a short term is not obvious, so that the attack may not be detected by using a simple traffic analysis algorithm. In some normal requests, such as proxy or Network Address Translation (NAT) service, a large traffic may also be found during a short time period, so that an error of the attack detection may occur. As for the packet transmission frequency detection method, it is difficult to detect the attack under the small traffic. In some normal requests, such as proxy or NAT service, the error of detection may occur as well.

SUMMARY OF THE INVENTION

In an embodiment, the present invention provides a flood attack detection method, which includes the following steps.

The total number of keywords of a source packet is acquired. The number of feature parameters corresponding to the source packet is acquired. A ratio of the number of feature parameters to the total number of keywords is compared with a preset threshold, and if the ratio is greater than or equal to the preset threshold, it is determined that a flood attack occurs.

In an embodiment, the present invention further provides a detection device, which includes: an acquisition unit, adapted to acquire the total number of keywords of a source packet and the number of feature parameters corresponding to the source packet; and a processing unit, adapted to compare a ratio of the number of feature parameters to the total number of keywords with a preset threshold, and determine that a flood attack occurs if the ratio is greater than or equal to the preset threshold.

These and other features will be more clearly understood from the following detailed description taken in conjunction with the accompany drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a schematic view of an application example according to the first embodiment of the present invention;

FIG. 5 is a schematic view of an application example according to the second embodiment of the present invention.

DETAILED DESCRIPTION OF THE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and device for detecting flood attacks. In one embodiment, the packets received by the same protected destination host are detected, if the received packets transmitted from a plurality of hosts all have similar text contents, it is assumed that the destination host is under the DDOS attack of these hosts. In another embodiment, if the text contents of the received packets transmitted from a plurality of hosts can alert randomly, the response packets in response to the received packets is detected. If a high error ratio of the response packets is detected, it is also considered that the destination host is under the DDOS attack of these hosts.

Hereinafter the embodiments of the present invention will be illustrated in detail with reference to the accompany drawings.

Figure 1:
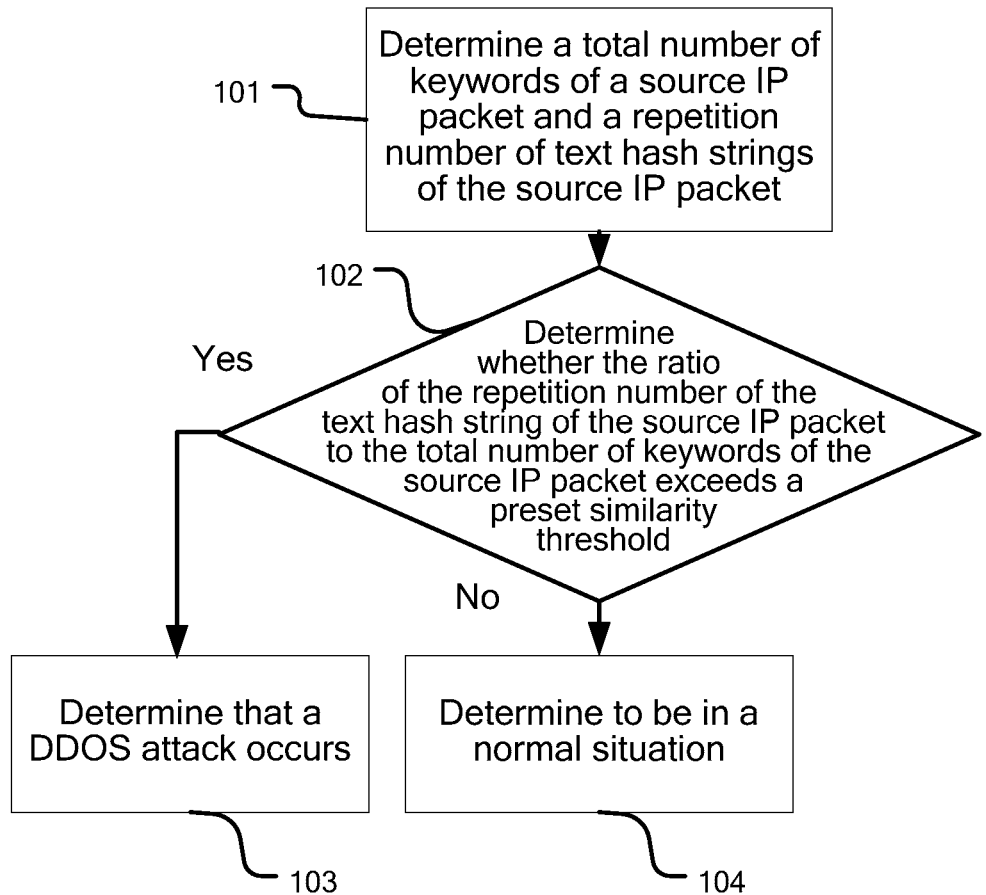
FIG. 1 is a flow chart of a flood attack detection method according to a first embodiment of the present invention.

FIG. 1 is a flow chart of a flood attack detection method according to a first embodiment of the present invention. Referring to FIG. 1, the first embodiment is directed to a situation where the keywords are normally carried, and includes the following steps.

In step 101: The total number of source IP packets with the keyword and the repetition number of text hash string from the source IP packet are determined; the keyword may introduce a series of different keywords, such as "Get" or "post". In the following description, it takes the keyword "Get" for an example.

In this step, the total number of source IP packets with the keyword and the repetition number of hash string from the text of the source IP packet are determined according to a pre-configured data table.

Hereinafter the data table in this embodiment of the present invention is introduced firstly.

Figure 2:
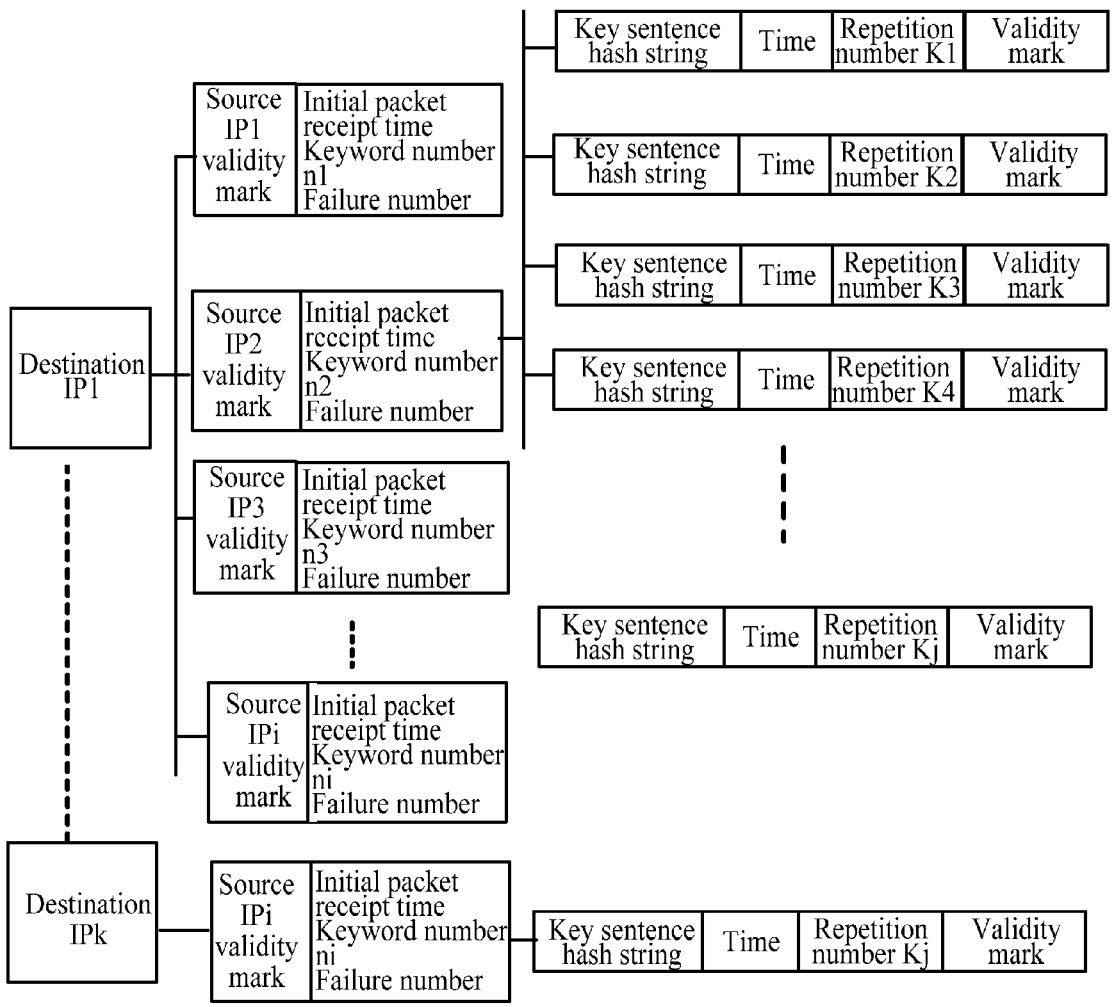
FIG. 2 is a schematic view of a data structure in a data table according to an embodiment of the present invention.

FIG. 2 is a schematic view of a data structure in a data table according to the first embodiment of the present invention.

Referring to FIG. 2, in the data structure of the data table, a first layer is constructed using a destination IP field of the packet as an index, a second layer is constructed using a source IP field of the packet as an index, and a third layer, serving as a major operating data layer, is constructed using key sentence hash strings formed after a hash transformation is performed on the key sentence of the text of the packet as an index.

A source IP validity mark in the second layer indicates whether the record is valid or not. An initial packet receipt time in the second layer indicates the time of receiving the first data packet carrying the keyword during an aging period. The total number of source IP packets with the keyword, such as keyword number n1 for source IP1, keyword number n2 for source IP2, keyword number n3 for source IP3, . . . keyword number n1 for source IPi, indicates the total number of the packets carrying the keyword during the aging period. The failure number indicates the total number of the failures of the response packets to source IP packets with the keyword.

A key sentence hash string in the third layer indicates a string of a fixed length, i.e., a key sentence hash string obtained by performing a hash transformation on a specific length selected from the key sentence carrying the keyword. A time in the third layer indicates the time of the latest repetition packets during the aging period, which may be altered constantly. A repetition number in the third layer indicates the number of the packets having the same key sentences which can be transformed by hash into the same key sentence hash string. A validity mark in the third layer indicates whether the key sentence hash string is valid or not.

After the packet is received, a protocol resolution is performed on the packet, usually to the application layer, and then a protocol classification is performed, such as, classifying into a regular Hypertext Transfer Protocol (HTTP), or a Domain Name System (DNS) protocol. After the protocol classification is finished, a feature filtering is performed to keep the packet carrying the keyword, for example, among the HTTP packets, the packet carrying "get" is left. After the feature filtering is performed, the packets are grouped according to the destination IP, i.e., according to whether the destination IP belongs to a protected IP. If yes, the packets are grouped, and filled into the first layer in the data structure. Thereafter, the record having the same source IP in the second layer is searched, the record is created if not being found, and then the source IP validity mark, the initial packet receipt time, and the total number of the record may be amended. After that, a hash transformation is performed on a fixed length of the key sentence of the text of the packet, and if the length of the key sentence of the text of the packet exceeds the fixed length, the hash transformation may be performed after the length is truncated, and a key sentence hash string is formed after the hash transformation is finished. Afterwards, the same key sentence hash string is searched throughout the third layer. If the same key sentence hash string can be found, the repetition number is added by 1, and the time field of the key sentence hash string in the third layer is modified. Otherwise, a new term is created, and the time and the repetition number are modified correspondingly. If the response to the received packet fails, the corresponding failure number in the second layer is added by 1. After the above process, the configuration of the data table of the embodiment of the present invention is accomplished.

In step 102, whether the ratio of the repetition number of the text hash string from the source IP packet to the total number of source IP packets with the keyword exceeds a preset similarity ratio threshold is determined. If yes, step 103 is performed, otherwise, step 104 is performed.

In step 103, it is determined that a DDOS attack occurs.

In step 104, it is determined as a normal situation.

The above process is described in detail as follows.

It is assumed that, in a period of time, the table in the second layer has n records of the source IP, and the third layer has m records of the key sentence hash string. It is assumed that the total number of source IP packets with the keyword in the $i^{th}$ source IP is total[i], the repetition number of the $j^{th}$ hash string of the $i^{th}$ source IP is sam[i][j]. During a set valid period, the key sentence hash strings with the repetition number greater than a threshold are picked up, the repetition number of similarity is counted, and the ratio of the repetition number of similarity to the total number of source IP packets with the keyword is compared with a preset similarity ratio threshold. If the ratio is greater than or equal to the similarity ratio threshold, it is determined that the source IP is one of the attack sources.

The program codes are illustrated as below but are not limited to this, and other program codes may be used to achieve the same goal.

```
int count[n];
for(int i=0;i<n;j++)
{
count[i]=0;
for(int j=0;j<m;j++)
{
If(sam[i][j]>= repetition number threshold&& valid[i]==true)
{
count[i]+= sam[i][j];
}
}
If( count[i]/total[i] >= similarity ratio threshold )
{
Do_Flood_Action1(&IP[i]); // IP[i] is one of the DDOS attack sources
}
}
```

FIG. 3 is a schematic view of an application example according to the first embodiment of the present invention.

Referring to FIG. 3, the attacked packet is acquired from the actual network. According to the method in the embodiment of the present invention, the Get keyword of the HTTP protocol is filtered, and according to the abovementioned method, upon statistics, the repetition number of the hash string of a Get sentence having a source IP address of 192.168.1.15 is determined to be overly large, and a ratio of which to the whole number of Get data packets exceeds a similarity ratio threshold, so that it is determined that a DDOS attack occurs, and the IP address is one of the attack sources.

Figure 4:
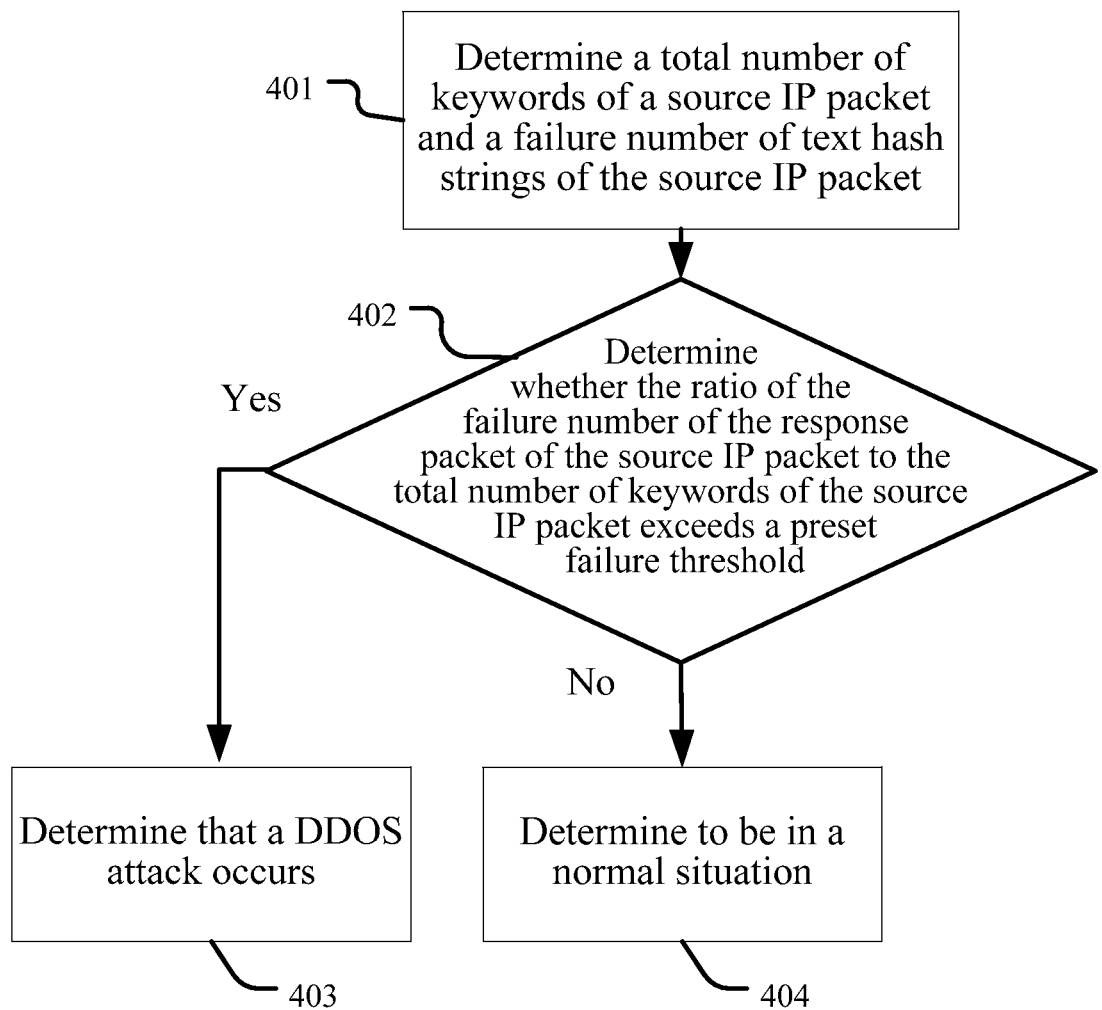
FIG. 4 is a flow chart of a flood attack detection method according to a second embodiment of the present invention.

FIG. 4 is a flow chart of a flood attacks detection method according to a second embodiment of the present invention. Referring to FIG. 4, the second embodiment is directed to a situation where the keywords are randomly carried, and includes the following steps.

In step 401, the total number of source IP packets with the keyword and the failure number of the response packets to the source IP packets are determined.

In this step, the total number of the source IP packets with the keyword and the failure number of the response packets to the source IP packets are determined according to a pre-configured data table.

The data table in this embodiment of the present invention is the same as that illustrated in the first embodiment, and will not be repeated herein.

In step 402, whether the ratio of the failure number of the response packets for the source IP packets to the total number of source IP packets with the keyword exceeds a preset failure threshold is determined. If yes, step 403 is performed; otherwise, step 404 is performed.

In step 403, it is determined that a DDOS attack occurs.

In step 404, it is determined as a normal situation.

The above process is described in detail as follows.

It is assumed that, in a period of time, the table in the second layer has n records of the source IP, and the third layer has m records of the key sentence hash string. It is assumed that the total number of source IP packets with the keyword in the $i^{th}$ source IP is total[i], the failure number of the $i^{th}$ response packets of the source IP is fail[i]. The failure number of the response packets is counted, and the ratio of the failure number of the response packets to the total number of source IP packets with the keyword is compared with a failure threshold. If the ratio is greater than or equal to the failure threshold, it is determined that the source IP is one of the attack sources.

The program codes are illustrated as below but are not limited to this, and other program codes may also be used to achieve the same goal.

```
for(int i=0;i<n;j++)
{
If(fail[i]>= failure number threshold&& fail[i]/total[i] >= failure
threshold)
{
Do__Flood__Action2(&IP[i]); // IP[i] is one of the DDOS attack sources
}
}
```

FIG. 5 is a schematic view of an application example according to the second embodiment of the present invention.

Referring to FIG. 5, the attacked packet is acquired from the actual network. According to the method in the embodiment of the present invention, the Get keyword of the HTTP protocol is filtered, upon statistics, and the Get sentence having a source IP address of 192.168.1.15 is determined to be at a response status that a large quantity of failure response packets exist such as http 400, which indicates that the requests from the random construction cause a lot of failures. Through the statistical analysis, it is known that a ratio of the failure number of response packets of the Get sentence to the total number of Get data packets exceeds a failure threshold, and it is determined that a DDOS attack occurs, and that the IP address is one of the attack sources.

It should be noted that, the method in the embodiment of the present invention is illustrated by taking the DDOS attack as an example, but is not limited to this, and the method can also be applied in the flood attacks detection in DNS or in other application protocols.

The flood attacks detection method according to the embodiments of the present invention is illustrated above in detail, and correspondingly, an embodiment of the present invention further provides a detection device.

Figure 6:
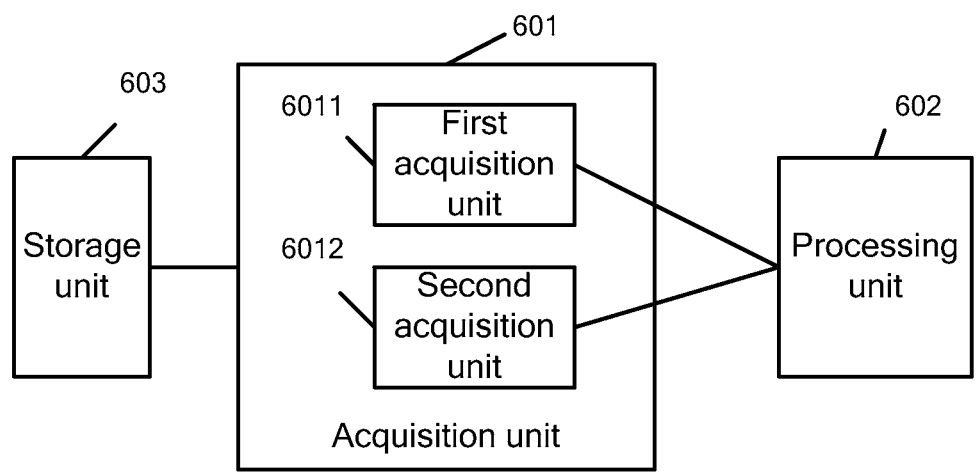
FIG. 6 is a schematic structural view of a detection device according to an embodiment of the present invention.

FIG. 6 is a schematic structural view of a detection device according to an embodiment of the present invention.

The detection device includes an acquisition unit 601 and a processing unit 602.

The acquisition unit 601 is adapted to acquire the total number of source IP packets with the keyword and the number of feature parameters of the source packet.

The processing unit 602 is adapted to compare the ratio of the number of feature parameters to the total number of source IP packets with the keyword with the preset threshold. If the ratio is greater than or equal to the preset threshold, it is determined that the flood attack occurs; otherwise, it is determined as a normal situation.

The acquisition unit 601 includes a first acquisition unit 6011 and a second acquisition unit 6012.

The first acquisition unit 6011 is adapted to acquire the total number of source IP packets with the keyword.

The second acquisition unit 6012 is adapted to acquire the number of feature parameters of the source packet. The number of feature parameters is the repetition number of the text hash string from the source IP packet, or the failure number of the response packets to the source packet. When the number of feature parameters is the repetition number of the text hash string from the source packet, the preset threshold is a preset similarity ratio threshold, and when the number of feature parameters is the failure number of the response packet of the source packet, the preset threshold is a preset failure threshold.

The detection device further includes a storage unit 603.

The storage unit 603 is adapted to store the data table consisting of the total number of source IP packets with the keyword and the number of feature parameters of the source packet. The total number of source IP packets with the keyword of the data table is obtained by calculating the number of the source packets carrying the keyword received within a preset time. If being the repetition number of the text hash string from the source packet in the data table, the number of feature parameters of the source packet is obtained by comparing the text hash string acquired from the hash transformation on the received source packet with the stored text hash string. If being the failure number of the response packet of the source packet, the number of feature parameters of the source packet in the data table is obtained by calculating the failure packet number of the response to the received source packet.

The abovementioned source packet refers to the source packet obtained after the keyword filtering. The data table is grouped using a destination address of the source packet as an index, and the total number of source IP packets with the keyword and the number of feature parameters of the source packet are stored in each group using the source address of the source packet as an index.

Based on the above, by making full use of all features of the flood attack, in the embodiments of the present invention, the total number of source IP packets with the keyword and the number of feature parameters corresponding to the source packet are acquired, and the ratio of the number of feature parameters to the total number of source IP packets with the keyword is compared with the preset threshold. If the ratio is greater than or equal to the preset threshold, it is determined that the flood attack occurs. In this way, the detection method is more accurate and simple.

Furthermore, in the technical solution of the embodiments of the present invention, under the circumstance that the packet carries the keyword normally, the number of feature parameters is the repetition number of the text hash string from the source packet, and under the circumstance that the packet carries the keyword randomly, the number of feature parameters is the failure number of the response packet of the source packet. In this way, the flood attack can be effectively detected under different circumstances.

Though the flood attack detection method and the detection device have been disclosed above by some exemplary embodiments of the present invention hereinabove, anybody skilled in the art can make some modifications and variations without departing from the spirit and scope of embodiment the present invention. Therefore, the specification should not be understood as the limitation to the present invention.

What is claimed is:

1. A flood attack detection method, the method being carried out by a computer device having a processor, comprising the steps of:
   receiving, by the device, source packets transmitted from a plurality of hosts, wherein the source packets include text content; and
   counting, by the device, a total quantity of the received source packets carrying a keyword in a predetermined time to obtain a total quantity of the source packets with the keyword, wherein each received source packet's text content carries the keyword; and
   obtaining, by the device, a quantity of a characteristic parameter of the source packets; and
   wherein if a ratio of the quantity of the characteristic parameter of the source packets to the total quantity of the source packets with the keyword exceeds or is equal to a preset threshold, it is determined that the flood attack occurs, wherein the characteristic parameter of the source packets is a repetition number of a text hash string in the source packets, and wherein the preset threshold is a similar threshold.

2. The flood attack detection method of claim 1, further comprising:
   obtaining, by the device, the text hash string after hash transformation; and
   counting, by the device, the obtained text hash string to obtain the repetition number of the text hash string of the source packets.

3. The flood attack detection method of claim 1, further comprising:
   performing, by the device, keyword feature filtering on the source packets, and the packets left is the source packets carrying the keyword.

4. A flood attack detection apparatus, comprising:
   a processor configured to receive source packets transmitted from a plurality of hosts, wherein the source packets include text content;
   count a total quantity of the received source packets carrying a keyword in a predetermined time to obtain a total quantity of the source packets with the keyword, wherein each received source packet's text content carries the keyword;
   obtain a quantity of a characteristic parameter of the source packets;
   compare a ratio of the quantity of the characteristic parameter to the total quantity of the source packets with the keyword with a preset threshold; and
   wherein if the ratio exceeds or is equal to the preset threshold, it is determined that the flood attack occurs, wherein obtain the quantity of the characteristic parameter of the source packets, further comprising: obtain a repetition number of a text hash string in the source packets, and wherein the preset threshold is a similar threshold.

5. The flood attack detection apparatus of claim 4, further comprising:
   a storage unit, configured to storage a data table consisting of the total quantity of keywords of the source packets and the quantity of characteristic parameter of the source packets.

* * * * *

UNITED STATES PATENT AND TRADEMARK OFFICE
CERTIFICATE OF CORRECTION

| | | |
|---|---|---|
| PATENT NO. | : 8,429,747 B2 | Page 1 of 1 |
| APPLICATION NO. | : 12/390664 | |
| DATED | : April 23, 2013 | |
| INVENTOR(S) | : Jiang | |

It is certified that error appears in the above-identified patent and that said Letters Patent is hereby corrected as shown below:

On the Title Page, Item [73] should read:

-- Chengdu Huawei Symantec Technologies Co., Ltd.
   Chengdu (CN) --.

Signed and Sealed this
Nineteenth Day of November, 2013

Teresa Stanek Rea
*Deputy Director of the United States Patent and Trademark Office*